US012783344B2

(12) United States Patent
Sinha et al.

(10) Patent No.: US 12,783,344 B2
(45) Date of Patent: Nov. 3, 2026

(54) SYSTEMS AND METHODS TO BACKUP AND RECONFIGURE MEMORY

(71) Applicant: Verkada Inc., San Mateo, CA (US)

(72) Inventors: Vikas Kumar Sinha, Sunnyvale, CA (US); Patrick Grady, San Francisco, CA (US); Rahul Desai, San Ramon, CA (US); Qiang Fu, Sunnyvale, CA (US); Bhavna Sud, Palo Alto, CA (US); Alan Martin Anderson, Los Altos, CA (US); Yunchao Gong, Los Altos, CA (US)

(73) Assignee: Verkada Inc., San Mateo, CA (US)

( * ) Notice: Subject to any disclaimer, the term of this patent is extended or adjusted under 35 U.S.C. 154(b) by 48 days.

(21) Appl. No.: 18/430,532

(22) Filed: Feb. 1, 2024

(65) Prior Publication Data

US 2025/0252008 A1 Aug. 7, 2025

(51) Int. Cl.
*G06F 11/00* (2006.01)
*G06F 11/07* (2006.01)

(52) U.S. Cl.
CPC ........ *G06F 11/0793* (2013.01); *G06F 11/073* (2013.01)

(58) Field of Classification Search
CPC ........................... G06F 11/073; G06F 11/0793
See application file for complete search history.

(56) References Cited

U.S. PATENT DOCUMENTS 8,527,549 B2 9/2013 Cidon
11,803,440 B2 * 10/2023 Harutyunyan .......... G06N 5/04
2022/0027257 A1 * 1/2022 Harutyunyan ...... G06F 11/3409
2022/0070407 A1 * 3/2022 Kale ...................... G06V 20/52
2022/0214954 A1 * 7/2022 Bergmann .......... G06F 11/3037
2023/0333926 A1 * 10/2023 Abrol .................... G06F 11/108

(Continued)

OTHER PUBLICATIONS

Foscam Home Security, "Why can't I access the camera remotely via the internet using DDNS and Port on SD camera?" first publication date unknown [online], published at: https://foscam.com/faqs/view.html?id=31 on May 30, 2023. Retrieved from https://web.archive.org/web/20230530012052/https://foscam.com/faqs/view.html?id=31, [retrieved on May 21, 2025]; 2 pages.

(Continued)

*Primary Examiner* — Joshua P Lottich
(74) *Attorney, Agent, or Firm* — COOLEY LLP

(57) ABSTRACT

In an embodiment, a non-transitory, processor-readable medium stores instructions that, when executed by a processor, cause the processor to receive, at a first time, sensor data from a remote sensor that includes a storage device, in response to a remote compute device identifying a performance deficiency of the storage device. The non-transitory, processor-readable medium further stores instructions that, when executed by the processor, cause the processor to, store the sensor data in response to receiving the sensor data. The non-transitory, processor-readable medium further stores instructions that, when executed by the processor, cause the processor to send, at a second time after the first time, the sensor data to the remote sensor in response to determining that the storage device has been reconfigured based on the performance deficiency.

18 Claims, 15 Drawing Sheets

(56) References Cited

U.S. PATENT DOCUMENTS

| | | | | |
|---|---|---|---|---|
| 2024/0020191 | A1* | 1/2024 | Harutyunyan | G06F 11/3409 |
| 2024/0028442 | A1* | 1/2024 | Harutyunyan | G06F 11/0769 |

OTHER PUBLICATIONS

Swann Security Systems, "Remote Access—Basic Troubleshooting," first publication date unknown [online], published at: https://support.swann.com/hc/en-us/articles/4747044853017-Remote-Access-Basic-Troubleshooting on Mar. 26, 2023. Retrieved from https://web.archive.org/web/20230326154755/https://support.swann.com/hc/en-us/articles/4747044853017-Remote-Access-Basic-Troubleshooting, [retrieved on May 21, 2025]; 3 pages.
Balani et al., "Multi-level Software Reconfiguration for Sensor Networks," EMSOFT '06: Proceedings of the 6th ACM & IEEE International conference on Embedded software, (Oct. 22, 2006), pp. 112-121. DOI: ps://doi.org/10.1145/1176887.1176904.
Gasmi et al., "Performance Optimization of Reconfigurable Real-Time Wireless Sensor Networks," IEEE Transactions on Systems, Man, and Cybernetics: Systems, (May 18, 2018), 50(7):2623-2637. DOI: 10.1109/TSMC.2018.2824900.
Gong et al., "Reliable SEU monitoring and recovery using a programmable configuration controller," Institute of Electrical and Electronics Engineers (IEEE), (Oct. 5, 2017), pp. 1-6. (Originally presented at 2017 27th International Conference on Field Programmable Logic and Applications (FPL), Sep. 4-8, 2017, Ghent, Belgium). DOI: 10.23919/FPL.2017.8056798.
Grace et al., "Dynamic Reconfiguration in Sensor Middleware," MidSens '06: Proceedings of the international workshop on Middleware for sensor networks, (Nov. 28, 2006), pp. 1-6. DOI: https://doi.org/10.1145/1176866.1176867.
Hu, "Self-configuration, monitoring and control of physical entities via sensor and actuator networks," [doctoral thesis], Universite Claude Bernard—Lyon I, (Apr. 29, 2014), 187 pages.
Lee et al., "Multi-Sensor Data Fusion with a Reconfigurable Module and Its Application to Unmanned Storage Boxes," Sensors, (Jul. 19, 2022), 22(14):5388:1-22. DOI: https://doi.org/10.3390/s22145388.
Liu et al., "A Novel Partial Dynamic Reconfiguration Image Sensor Node for Wireless Multimedia Sensor Networks," [abstract], High Performance Computing and Communication & IEEE International Conference on Embedded Software and Systems (IPPCC-ICESS 2012), Jun. 25-27, 2012, Liverpool, UK. [Accessed May 22, 2026, publicly available at URL: https://www.computer.org/csdl/proceedings-article/hpcc-icess/2012/4749b368/12OmNBWzHR9], 3 pages.
Mohanram et al., "5G-Based Multi-Sensor Platform for Monitoring of Workpieces and Machines: Prototype Hardware Design and Firmware," Electronics, MDPI, (May 19, 2022), 11(10):1619:1-14. DOI: https://doi.org/10.3390/electronics11101619.
Philippe, "Runtime Hardware Reconfiguration in Wireless Sensor Networks for Condition Monitoring," [doctoral dissertation], Technische Universität Darmstadt, (Sep. 24, 2014), 219 pages.
Taherkordi et al., "Optimizing Sensor Network Reprogramming via In Situ Reconfigurable Components," ACM Transactions on Sensor Networks (TOSN), (Mar. 2013), 9(2):14:1-33. DOI: https://doi.org/10.1145/2422966.2422971.

* cited by examiner

```
Errors = … # list of errors in order of priority, maps to tuple of
(error, threshold)

Cameras = … # list of all cameras in filtered logs list

Logs = … # map of camera -> log message for past N days,
count of message over last N days

root_error … # result, map of camera -> root error

For each c in cameras:
                root_error[c] = null
        For each e in errors:
                For each L in logs[c]:
                                                If L == e.msg and e.count
> e.threshold:
                                                                root_error[c] =
e.msg
                                If root_error[c] != null:
                                                break
```

FIG. 9

1. 'ran ffu': 1,
2. 'reformatted sd card': 1,
3. 'reformat partition': 1,
4. 'mmc req failed': 10,
5. 'I/O error': 10,
6. 'image sensor failure': 10,
7. 'kernel write timeout': 1,
8. 'mount error': 1,
9. 'FAT buffered read failure': 1,
10. 'mmc_err transferring data': 50,
11. 'superblock error': 1,
12. 'no mounted storage': 1,
13. 'libstorage: no space': 1,
14. 'sm writer down': 20,
15. 'storage index down': 20,
16. 'stream down - health check reboot': 20,
17. 'ramdisk full': 20,
18. 'health check reboot (other)': 20

FIG. 10

SYSTEMS AND METHODS TO BACKUP AND RECONFIGURE MEMORY

FIELD

One or more embodiments are related to systems and methods to backup and reconfigure memory.

BACKGROUND

Cameras sometimes include storage devices such as secure digital (SD) cards. Storage devices, however, can develop or exhibit performance deficiencies that are not always easy to detect. Accordingly, it can be desirable to detect and mitigate such performance deficiencies.

SUMMARY

In an embodiment, a method includes determining, at a processor and based on (1) an amount of sensor data stored at a storage device of a sensor and (2) an uptime of the sensor, that the storage device has a performance deficiency. The method further includes identifying, via the processor, in response to determining that the storage device has the performance deficiency and based on at least one of a set of error logs associated with the sensor or a set of performance metrics associated with the sensor, a condition associated with the performance deficiency. The method further includes receiving, at the processor, a signal indicating that the sensor has sent at least a portion of the sensor data to a remote compute device. The method further includes, in response to receiving the signal, identifying a reconfiguration based on the condition and causing the reconfiguration to be implemented at the storage device.

In an embodiment, a sensor includes a storage device and a processor operatively coupled to the storage device. The processor is configured to receive sensor data. The processor is further configured to, in response to receiving the sensor data, store the sensor data at the storage device. The processor is further configured to send a first signal to a first remote compute device indicating (1) an amount associated with the sensor data stored at the storage device, and (2) an uptime of the sensor, the first remote compute device configured to identify a performance deficiency of the storage device based on the amount and the uptime. The processor is further configured to, in response to receiving a second signal from the first remote compute device and after the first remote compute device has identified the performance deficiency, send the sensor data to a second remote compute device. The processor is further configured to, after sending at least a predefined amount of the sensor data to the second remote compute device, reconfigure the storage device based on the performance deficiency. The processor is further configured to, in response to reconfiguring the storage device, receive the sensor data from the second remote compute device.

In an embodiment, a non-transitory, processor-readable medium stores instructions that, when executed by a processor, cause the processor to receive, at a first time, sensor data from a remote sensor that includes a storage device, in response to a remote compute device identifying a performance deficiency of the storage device. The non-transitory, processor-readable medium further stores instructions that, when executed by the processor, cause the processor to, store the sensor data in response to receiving the sensor data. The non-transitory, processor-readable medium further stores instructions that, when executed by the processor, cause the processor to send, at a second time after the first time, the sensor data to the remote sensor in response to a determination that the storage device has been reconfigured based on the performance deficiency.

BRIEF DESCRIPTION OF THE DRAWINGS

FIG. 9 illustrates an example of steps to filter logs, according to an embodiment.

FIG. 10 illustrates an order for log reduction, according to an embodiment.

DETAILED DESCRIPTION

Figure 1:
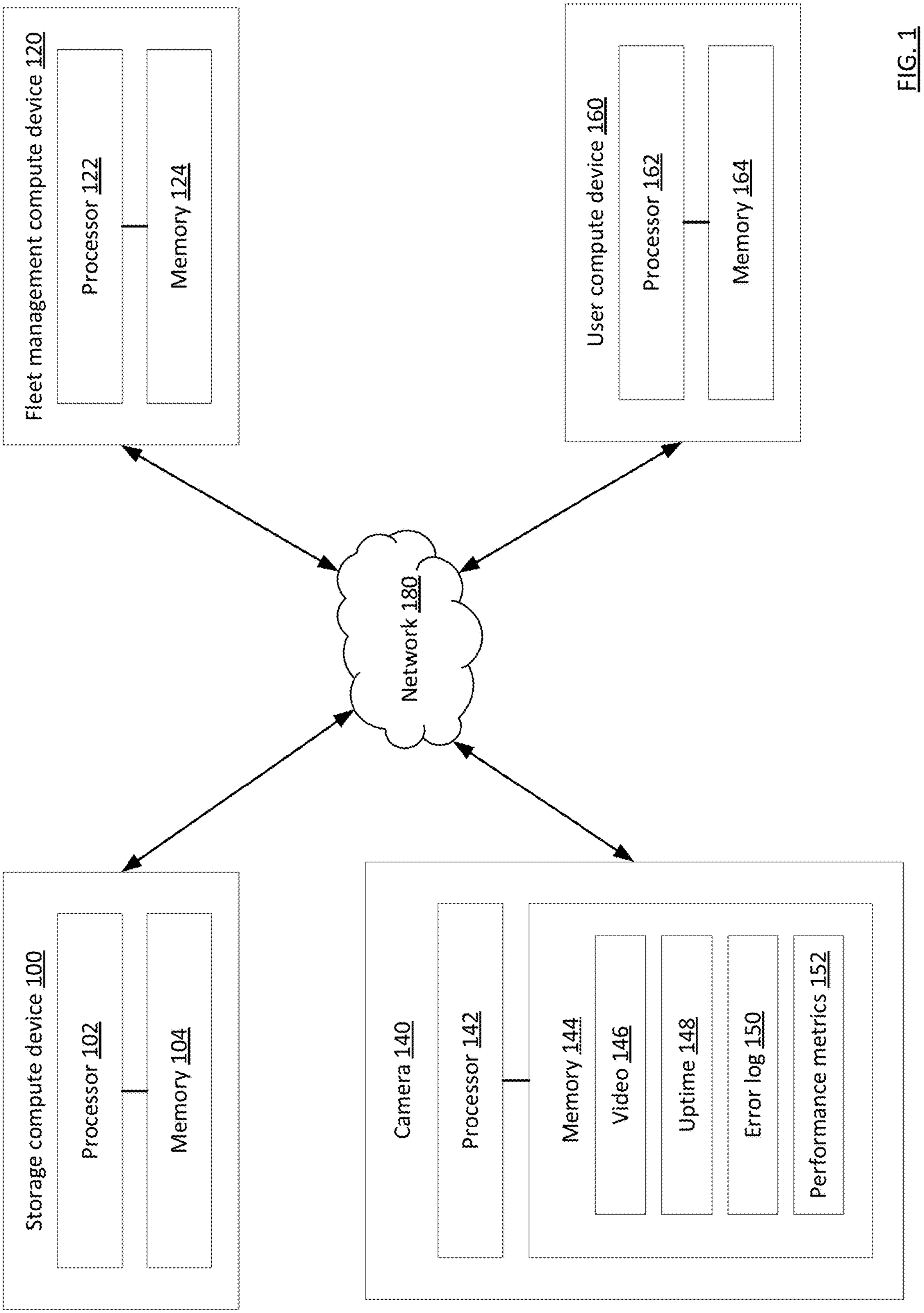
FIG. 1 shows a diagram of a system to manage sensor data for a storage device having a performance deficiency, according to an embodiment.

One or more embodiments of the present disclosure are related to determining that a storage device of a sensor has a performance deficiency. In response to determining that the performance deficiency exists, data stored on the storage device can be sent to a remote compute device, which in turn can store the data while the storage device is reconfigured. After the storage device has been reconfigured, the data can be sent back from the remote compute device to the storage device of the sensor. In some implementations, by performing the reconfiguration, a performance of the storage device and/or a performance of the sensor improves.

Some implementations are related to detection, diagnosis, and repair of storage device performance issues, e.g., for storage devices that are attached to/included within cameras, without loss of recorded video files/data, even if data on the storage device is deleted during repair. In some implementations, a method includes a retention check process to determine whether the storage device needs repair, a failure diagnosis process to determine one or more most likely causes of the error(s), and a remote fix process to repair the storage device without loss of video data, e.g., using cloud resources.

Some techniques described herein are related to determining that a storage device of a camera has a performance deficiency and sending video footage captured by the camera to a remote compute device while the storage device is reconfigured (or repaired or replaced). The camera can be, in some implementations, a security camera configured to capture video footage and share (e.g., as a livestream) that video footage to a requesting user. In some cases, however, cameras can capture more sensor data (e.g., high resolution video data) compared to other known sensors. Since the amount of sensor data is larger, the storage devices' chances of encountering a performance deficiency can be larger. Additionally, cameras can be located and used in settings that subject the camera to, for example, more extreme weather conditions or obstruction by humans, animals, debris, etc.; this can affect the storage device and potentially cause a performance deficiency.

Some techniques described herein use a filtered set of error logs to, for example, determine a condition associated with (e.g., that caused) a performance deficiency. Rather than using a full set of error logs, that full set of error logs can be filtered to identify, for example, the most relevant error logs or error logs specific to a predetermined set of conditions. By analyzing fewer error logs, techniques such as determining the condition(s) associated with (e.g., at the root cause of) the performance deficiency can be performed faster and more efficiently.

Some techniques described herein include performing a reconfiguration to transform a storage device (e.g., from a condition in which the storage device has a performance deficiency, to a condition in which the storage device no longer has the performance deficiency or to a condition in which the storage device has a performance that is improved relative to the performance deficiency condition). If the storage device is determined to have a performance deficiency, the reconfiguration can be performed to transform the storage device to correct and/or mitigate the performance deficiency. Examples of such reconfiguration can include changing a firmware of the storage device, reformatting the storage device, reformatting a partition thereof, forcing a time sync, and/or the like. As another example, the sensor that includes the storage device can be transformed if, for example, the reconfiguration includes removing and replacing the storage device, or adding physical structure to the storage device (e.g., a cage or housing to protect the physical structure from physical damage).

Some techniques described herein include sending sensor data to a remote compute device for storage until the storage device has been reconfigured. Because some sensors have relatively small overall sizes (e.g., compact form factors) and/or low weights, saving sensor data to a different portion of the sensor (e.g., a different storage device of the sensor) may not be desirable, practical, or possible. By instead using a remote compute device for storage, the sensor can be smaller and lighter since, for example, the sensor doesn't include additional backup storage devices.

FIG. 1 shows a diagram of a system to manage sensor data for a storage device having a performance deficiency, according to an embodiment. FIG. 1 includes storage compute device 100, fleet management compute device 120, camera 140, and user compute device 160, each communicatively coupled to one another via network 180.

Network 180 can be any suitable communications network for transferring data, for example operating over public and/or private communications networks. For example, network 180 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, network 180 can be a wireless network such as, for example, a Wi-Fi® or wireless local area network ("WLAN"), a wireless wide area network ("WWAN"), and/or a cellular network. In other instances, the network 180 can be a wired network such as, for example, an Ethernet network, a digital subscription line ("DSL") network, a broadband network, and/or a fiber-optic network. In some instances, network 180 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via network 180 can be encrypted or unencrypted. In some instances, network 180 can include multiple networks or subnetworks operatively coupled to one another by, for example, network bridges, routers, switches, gateways and/or the like.

Storage compute device 100 can include processor 102 operatively coupled to memory 104 (e.g., via a system bus). Camera 140 can include processor 142 operatively coupled to memory 144 (e.g., via a system bus). Fleet management compute device 120 can include processor 122 operatively coupled to memory 124 (e.g., via a system bus). User compute device 160 can include processor 162 operatively coupled to memory 164 (e.g., via a system bus).

Processors 102, 122, 142, and/or 162 can be, for example, a hardware-based integrated circuit (IC) or any other suitable processing device configured to run and/or execute a set of instructions or code. For example, processors 102, 122, 142, and/or 162 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processors 102, 122, 142, and/or 162 can be configured to run any of the methods and/or portions of methods discussed herein.

Memories 104, 124, 144, and/or 164 can be, for example, a random-access memory (RAM), a memory buffer, a hard drive, a read-only memory (ROM), an erasable programmable read-only memory (EPROM), and/or the like. Memories 104, 124, 144, and/or 164 can be configured to store any data used by processors 102, 122, 142, and/or 162 (respectively) to perform the techniques (methods, processes, etc.) discussed herein. In some instances, memories 104, 124, 144, and/or 164 can store, for example, one or more software programs and/or code that can include instructions to cause processors 102, 122, 142, and/or 162 (respectively) to perform one or more processes, functions, and/or the like. In some implementations, memories 104, 124, 144, and/or 164 can include extendible storage units that can be added and used incrementally. In some implementations, memories 104, 124, 144, and/or 164 can be a portable memory (for example, a flash drive, a portable hard disk, a SD card, and/or the like) that can be operatively coupled to processors 102, 122, 142, and/or 162 (respectively). In some instances, memories 104, 124, 144, and/or 164 can be remotely operatively coupled with a compute device (not shown in FIG. 1). In some instances, memories 104, 124, 144, and/or 164 is a virtual storage drive (e.g., RAMDisk), which can improve I/O speed and in turn, accelerate image reading and writing. In some implementations, the term "memory" can be used interchangeably with "storage device."

Camera 140 can be or include any type of camera that can capture images and/or video, such as a dome camera, bullet camera, fisheye camera, internet protocol (IP) camera, 4K camera, pan-tilt-zoom (PTZ) camera, Wi-Fi camera, license plate recognition (LPR) camera, and/or the like.

Memory 144 can include (e.g., store) representations of video 146 and uptime 148. Uptime 148 can include a duration of time over which a given camera/sensor has been recording data and/or can include a duration of time over which a given storage device has been successfully storing data generated by the camera/sensor. The uptime can indicate (e.g., can correlate with) an amount of video footage and/or other image data that camera 140 has captured/recorded, e.g., for a predefined period of time. In some implementations, video footage and/or other image data that camera 140 has "captured" or "recorded" does not always mean that video footage and/or other image data has also been "stored" (e.g., if memory 144 has a performance deficiency). Video 146 can represent the video footage that camera 140 captured/recorded within that predetermined period of time and stored/actually present at memory 144. It is possible that all video captured during uptime 148 is stored in memory 144 as video 146. For example, camera 140 may have recorded 12 hours of video on Jan. 1, 2025 (those 12 hours representing the uptime) and all 12 hours of video may have been stored as video 146 at memory 144/camera 140. It is also possible, however, that not all video captured during a given uptime 148 is stored in memory 144 as video 146. For example, camera 140 may have recorded 12 hours of video on Jan. 1, 2025 (the uptime) but only 11 hours and 55 minutes of that video may have been stored as video 146 at memory 144/camera 140. Accordingly, an amount (e.g., duration/length of video footage) associated with video 146 can be less than or equal to uptime 148. Furthermore, video 146 and uptime 148 can be used to determine/estimate how much of the footage that was recorded is actually present in memory 144, and therefore whether memory 144/camera 140 is losing (e.g., not storing) video footage.

Memory 144 can also include (e.g., store) error logs 150. Error logs 150 can include one or more error logs. In some implementations, error logs 150 can include/represent records of error conditions. Error logs 150 can be used to save/"log" error conditions such as when memory 144 stopped storing data, when memory 144 became full, if and when a reboot occurred, errors encountered by devices communicatively coupled to memory 144, and/or the like.

In some implementations, error logs 150 can represent a filtered down subset of one or more larger error logs. Stated another way, excerpts from a larger set of error logs can be selected, based on one or more filters, to generate the error logs 150, since not all error logs from the larger set of error logs may be important/useful for determining a condition/root cause of a performance deficiency. Thus, error logs 150 may represent only those logs that are relevant to the identification of a performance deficiency. In some implementations, examples of error logs that are relevant to the identification of a performance deficiency include error logs associated with memory 144 (e.g., MultiMediaCard (MMC), block IO, filesystem errors, and/or the like) and/or error logs associated with systems that can cause video data to be lost (e.g., network time protocol (NTP), encoder errors, other hardware issues, and/or the like).

In some implementations, error logs 150 can be used (e.g., by fleet management compute device 120 and/or camera 140) to identify multiple errors. In some implementations, those multiple errors can be prioritized/ranked. For example, a list can be generated that ranks the multiple errors to reflect higher and lower relative priority to resolve/mitigate. The list can then be used to identify one or more reconfigurations that is/are to occur. For example, the reconfiguration that resolves/mitigates the errors of highest priority, the most errors on the list, or a combination thereof can be chosen. In some implementations, those multiple error can be prioritized/ranked based on input from a user (e.g., that ranks/prioritizes the errors).

Memory 144 can also include (e.g., store) performance metrics 152. In some implementations, performance metrics 152 can represent performance metrics of memory 144. Performance metrics 152 can include values for metrics such as miss ratio (e.g., cache misses compared to total number of received content requests), average miss latency (e.g., average total time taken to search an element in the cache and the element is not found), average memory access time (e.g., average length of time for a character in RAM to be transferred to or from the CPU), memory access per cycle (e.g., number of memory accesses requested during a cycle of reading or writing a byte of memory), and/or the like.

Fleet management compute device 120 can be any type of compute device, such as a server, desktop, laptop, tablet, smartphone, and/or the like. Fleet management compute device 120 can be configured to check (e.g., periodically, continuously, sporadically) performance of camera 140 and memory 144 to determine if memory 144 has a performance deficiency. For example, fleet management compute device 120 can receive an electronic signal from camera 140 indicating an amount associated with/of video 146 (e.g., a length/duration of video 146, a size/number of bytes of video 146) and uptime 148 to (1) determine/estimate how much of the video footage that was recorded is actually present in memory 144 and (2) whether memory 144/camera 140 is losing video footage. In some implementations, if the length/duration of video 146 is less than uptime 148 by more than a predetermined threshold and/or a ratio of the length/duration of video 146 compared to uptime 148 is outside a predetermined acceptable range, fleet management compute device 120 can determine that memory 144 has a performance deficiency. In some implementations, fleet management compute device 120 can receive an electronic signal from camera 140 indicating an amount associated with video 146 (e.g., a length/duration of video 146) and uptime 148, but not video 146 itself, which can reduce the amount of data to be sent and improve processing efficiency/speed.

In response to determining that memory 144 has a performance deficiency, a condition associated with the performance deficiency can be identified based on error logs 150 and/or performance metrics 152. In some implementations, the condition associated with the performance deficiency refers to the cause(s) of the performance deficiency. Said differently, a root cause analysis for the performance deficiency can be performed. Examples of conditions include MultiMediaCard (MMC) error, RAM disk being full, an abort or timeout, a health check reboot, an improperly mounted partition, file allocation table (FAT) error (e.g., kernel level filesystem errors that indicate inconsistency in filesystem data structures), a clock skew, a timer lag, a low uptime, a network connectivity error, a fragment MPEG-4 part 14 (FMP4) error, a subsystem error, and/or the like.

In some implementations, determining the condition associated with the performance deficiency includes detecting an anomaly based on (1) a correlation of uptime 148 and the performance metrics 152 and (2) a predefined threshold associated with at least one performance metric from performance metrics 152. In some implementations, each performance metric from performance metrics 152 is associated with at least one predefined threshold, and if a result that is a function of uptime 148 and value associated with that performance metric is above (and/or below, depending on the performance metric) the at least one predefined threshold, an anomaly is detected and that performance metric's value can indicate the condition and/or be used to determine the condition.

In some implementations, determining the condition associated with the performance deficiency includes inputting error logs 150 and/or performance metrics 152 to a machine learning (ML) model configured to generate an output indicating the condition. The ML model can be trained beforehand. For example, in some implementations, the ML model is a neural network that was trained using error logs and/or performance metrics and input learning data and associated conditions are target learning data.

After determining the condition associated with the performance deficiency of memory 144, a representation of video 146, uptime 148, error logs 150, performance metrics 152, and/or other data stored at memory 144 can be sent, via camera 140, to storage compute device 100 and stored at memory 104. In some implementations, after video 146, uptime 148, error logs 150, performance metrics 152, and/or other data stored at memory 144 is sent to storage compute device 100, video 146, uptime 148, error logs 150, performance metrics 152, and/or other data stored at memory 144 be deleted from memory 144 to save space. In some implementations, a copy of video 146, uptime 148, error logs 150, performance metrics 152, and/or other data stored at memory 144 is sent to storage compute device 100 and video 146, uptime 148, error logs 150, performance metrics 152, and/or other data stored at memory 144 can also remain in memory 144 In some implementations, video 146 is sent to storage compute device 100, but uptime 148, error logs 150, and performance metrics 152 are not sent to storage compute device 100 (e.g., to save space at memory 104, to reduce processing time, etc.). Storage compute device 100 can be any type of compute device, such as a server, desktop, laptop, tablet, smartphone, and/or the like.

After fleet management compute device 100 has received a signal indicating that the data to be stored at storage compute device 100 has been received and stored, a reconfiguration can identified based on the condition associated with the performance deficiency of memory 144. The reconfiguration could be, for example, steps to be taken at camera 140 to resolve and/or mitigate the condition and performance deficiency. Different reconfigurations can be identified for different conditions. Examples of reconfigurations include replacing memory 144 with a new memory, a firmware update, a reformatting memory 144, a reformatting of a partition of memory 144, a forced time sync, and/or the like.

After fleet management compute device 120 has identified the reconfiguration, that reconfiguration is caused to be implemented at memory 144. In some implementations, fleet management compute device 120 can send an electronic signal to camera 140 indicating and/or initiating the reconfiguration. For example, fleet management compute device 120 can send an electronic signal to camera 140 indicating a firmware update for camera 140 or command to reformat memory 144, reformat a partition of memory 144, perform a forced time sync, and/or the like. In response to receiving the electronic signal, camera 140 can execute the reconfiguration.

After camera 140 has executed and completed the reconfiguration, storage compute device 100 can receive (e.g., from camera 140 and/or fleet management compute device 120) indication to send the data previously received from camera 140 and stored at memory 104 (e.g., video 146, uptime 148, error logs 150, performance metrics 152, and/or the like) back to camera 140. For example, if camera 140 previously sent a representation of video 146 to storage compute device 100 before executing a reconfiguration, storage compute device 100 can send a representation of video 146 back to camera 140 for storing at memory 144. In some implementations, after storage compute device 100 has sent the data previously received from camera 140 back to camera 140, that data can be deleted from memory 104 (e.g., to save memory).

User compute device 160 can be any type of compute device, such as a server, desktop, laptop, tablet, smartphone, and/or the like. A user may use user compute device 160 to request video 146. For example, if video 146 is a livestream, a user can use user compute device 160 to request viewing the livestream.

If user compute device 160 requests video 146 while video 146 is stored at storage compute device 100, user compute device 160 can receive video 146 via storage compute device 100 and not camera 140. If user compute device 160 requests video 146 while video 146 is stored at camera 140 and/or not stored at storage compute device 100, user compute device 160 can receive video 146 via camera 140 and not storage compute device 100.

In some implementations, after camera 140 has executed the reconfiguration, camera 140 can be checked again for a performance deficiency. If camera 140 still has a performance deficiency, the aforementioned process can be repeated and/or a different remedial action is taken (e.g., a user is notified of the deficiency). If camera 140 no longer has a performance deficiency, camera 140 can be marked has healthy.

Although FIG. 1 includes camera 140 and video 146, in other implementations, any other type of sensor and/or sensor data can be used. Additionally, although FIG. 1 illustrated four compute devices performing different tasks, in other implementations, more or less compute devices can be used and/or different compute devices can perform different tasks. For example, in some implementations, the functions of storage compute device 100 and fleet management compute device 120 can be performed by a single computer. As another example, that camera 140 has a performance deficiency can be determined by camera 140 instead of fleet management compute device 120. Additionally, although FIG. 1 was discussed with respect to a single camera, techniques described herein can be applied across any number of cameras. For example, fleet management compute device 120 can monitor for performance deficiencies, identify conditions for the performance deficiencies, cause reconfigurations, and/or the like for any number of cameras.

Figure 2:
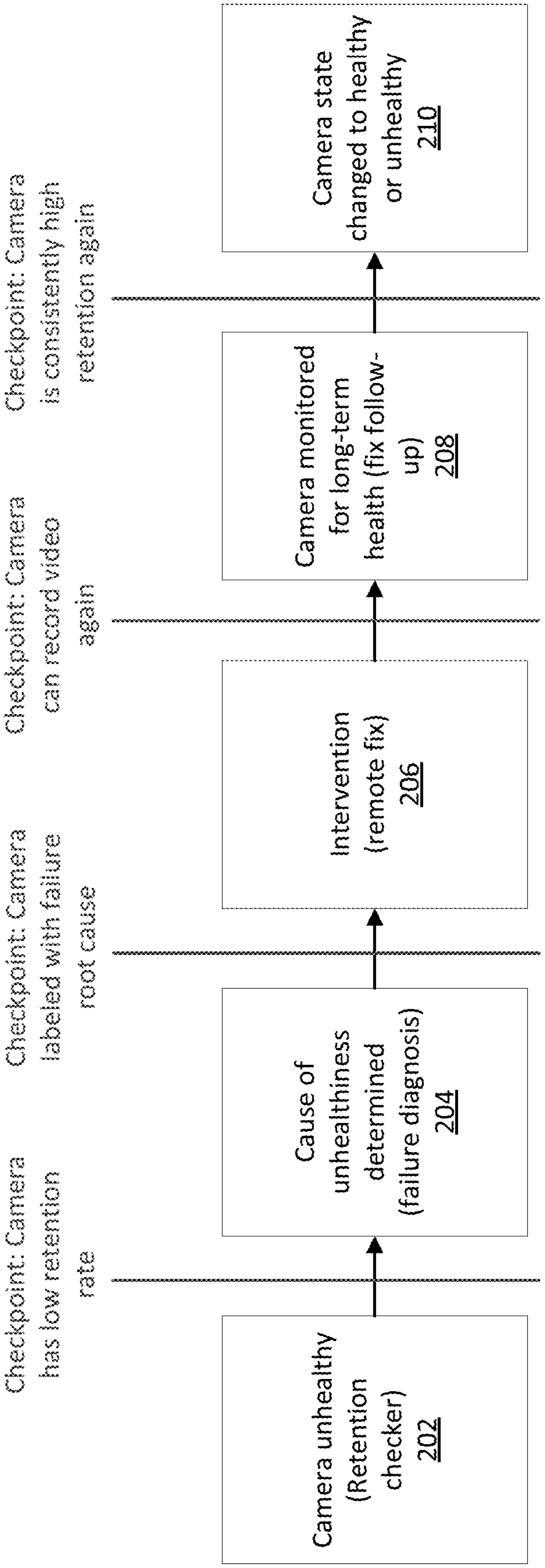
FIG. 2 illustrates a process to monitor a camera's health, according to an embodiment.

FIG. 2 illustrates a process to monitor a camera's health, according to an embodiment. At 202, a camera (e.g., camera 140) is determined (e.g., at processor 142 of camera 140 and/or processor 122 of fleet management compute device 120) to be unhealthy via a retention checker (e.g., software executing on processor 142 and/or 122). The camera can be determined to be unhealthy based on the camera's retention rate being less than a predetermined threshold. The camera's retention rate can be determined by comparing the camera's uptime (e.g., uptime 148) and a duration/length of video actually stored at the camera (e.g., video 146). In response to completing 202, a determination is made that the camera has a low retention rate.

At 204, a failure diagnosis is performed (e.g., at processor 142 of camera 140 and/or processor 122 of fleet management compute device 120) to determine a cause of the camera's unhealthiness. The cause can be determined based on, for example, performance metrics (e.g., performance metrics 152), error logs (e.g., error logs 150), the camera's uptime, and/or the like. For example, statistical analysis can be used to correlate error signatures with low retention. If error logs are used, raw log output can be filtered to produce a reduced dataset that can enable more efficient computation. In some implementations, statistical analysis is performed to identify logs that are highly correlated with low camera retention. In some implementations, the cause of unhealthiness is determined using a machine learning model (e.g., rule-based machine learning model). In some implementations, the cause of unhealthiness is determined using predetermined thresholds. In some implementations, where multiple causes are determined, those causes can be ranked based on priority so that higher-priority causes are resolved/mitigated before lower-priority causes. In response to completing 204, the camera is labelled with the root cause of the failure/unhealthiness.

At 206, an intervention can occur and the camera can be fixed/repaired (optionally via a "remote fix," whereby the repair is initiated by a compute device that is geographically remote from the camera). For example, a reconfiguration for the camera can be determined (e.g., at processor 142 of camera 140 and/or processor 122 of fleet management compute device 120) based on the cause of unhealthiness determined at 204, and the reconfiguration can be executed at the camera. Prior to executing a reconfiguration, video stored on the camera can be backed up (e.g., at the cloud) (and, optionally, deleted thereafter from the camera) so that video data is not lost during the reconfiguration. Even while the reconfiguration is occurring, however, a user can request to access the video; the video, however, can be sent to the user's compute device from the cloud and not the camera. In response to completing 206, the camera can record video again.

At 208, the camera is monitored (e.g., continuously, periodically, sporadically, and/or the like; at processor 142 of camera 140 and/or processor 122 of fleet management compute device 120) for long-term health. Monitoring can include, for example, determining if the camera is unhealthy based on the camera's new retention rate. If the camera is determined to be healthy (e.g., the camera is not determined to be unhealthy a minimum consecutive number of times, the camera is not determined to be unhealthy at least a minimum consecutive length of time, etc.), the camera's state can be changed to healthy at 210. If, however, the camera is determined to be unhealthy, 204 to 210 can repeat. In response to completing 208, the camera's retention can consistently be high again.

Figure 3:
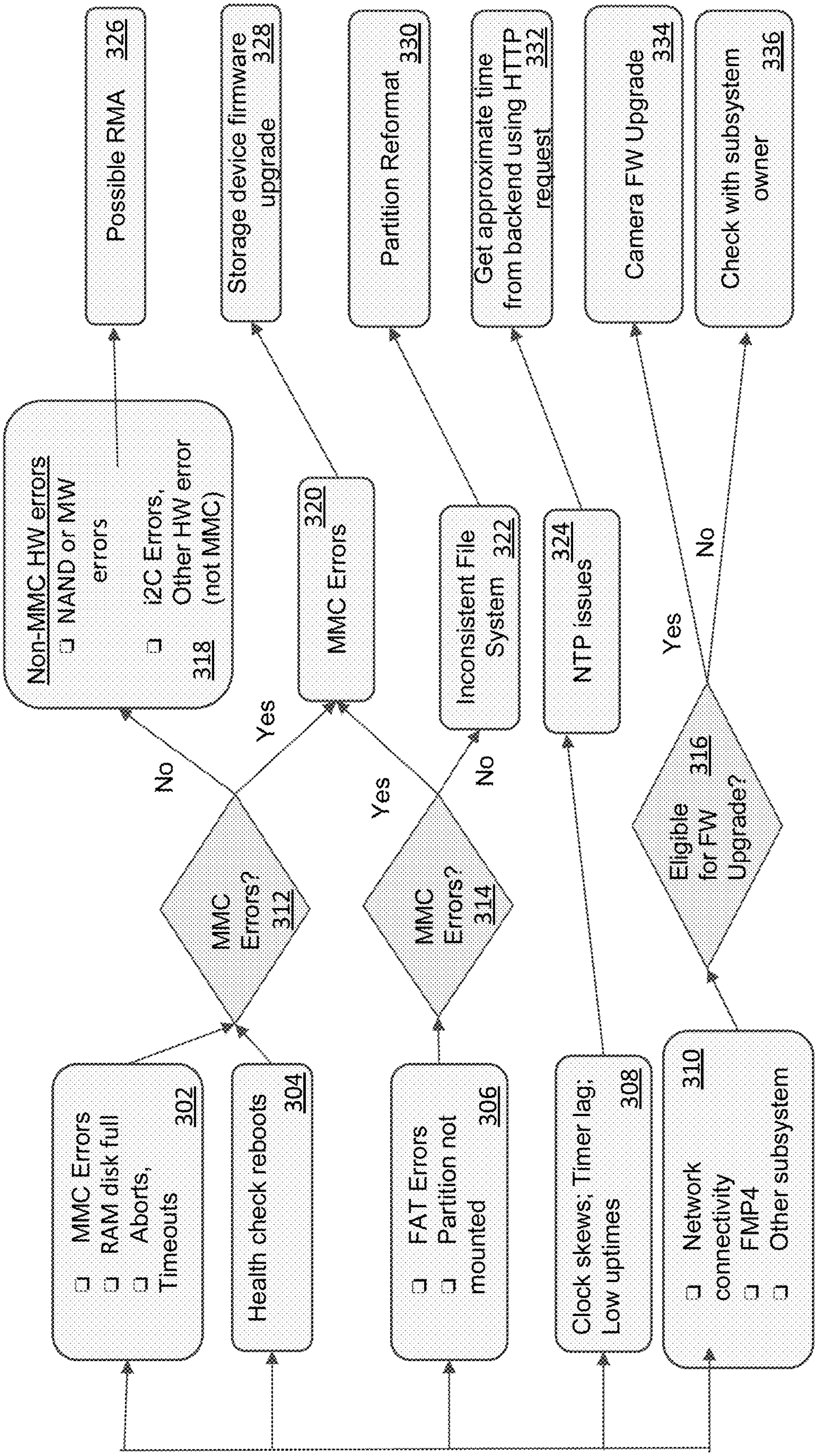
FIG. 3 illustrates a process to determine what reconfiguration should be executed based on the condition determined to cause a performance deficiency, according to an embodiment.

FIG. 3 illustrates a process to determine (e.g., by fleet management compute device 120 and/or camera 140) what reconfiguration should be executed based on the condition determined to cause a performance deficiency, according to an embodiment. As shown at 302 and 304, if the condition determined to cause the performance deficiency is an MultiMediaCard (MMC) error, a RAM disk being full, aborts, timeouts, or a health check reboot, a determination is made at 312 as to whether the error is an MMC error. An MMC error can be, for example, a symptom observed in host driver code that a MMC command to the SD card has failed to be performed. In FIG. 3, although MMC is used, other storage devices of the sensor can be used in other implementations, such as a secure digital (SD) card. A RAM disk can refer to an in-memory filesystem. In some implementations, the RAM disk is used as a queue/buffer for video data. If the RAM disk fills up then the RAM disk is getting filled but not drained; this is an error condition that causes data to be lost. A health check reboot can trigger the camera to reboot if it detects certain unhealthy characteristics (e.g., process crashing).

If, at 312, the error is determined to not be an MMC error and, as shown at 318, a NOT-AND (NAND) or MW error, inter-integrated circuit (i2C) error, or other hardware (HW) error that is not MMC exists at the camera, the reconfiguration at 326 is return merchandise authorization (RMA) (e.g., the camera cannot be fixed remotely and the user needs their device replaced). If, at 312, the error is determined to be an MMC error, a firmware of the storage device can be upgraded at 328. In some instances, NAND can refer to unmanaged NAND (and not managed NAND like an SD card) that can be used as storage for the operating system, configuration and small persistent buffer space, and/or the like. In some instances, a firmware update or upgrade refers to the process of updating the firmware image within the storage device (e.g., SD card) itself; this can cause, for example, the data stored on the storage device to be erased.

As shown at 306, if the condition determined to cause the performance deficiency is a file allocation table (FAT) error (e.g., kernel level filesystem errors which can indicate inconsistency in filesystem data structures) of partition not being mounted, a determination is made at 314 as to whether the error is an MMC error. If at 314 the error is determined to be an MMC error, a firmware of the storage device can be upgraded at 328. If at 314 the error is determined to not be an MMC error, the storage device has an inconsistent file system (as shown at 322) and a partition of the storage device can be reformatted at 330.

As shown at 308, if the condition determined to cause the performance deficiency is a clock skew, timer lag, or low uptime, the storage device has a network time protocol (NTP) issue (as shown at 324) and an approximate time of the NTP issue is received using an HTTP request from the backend at 332. NTP can refer to adjust the time, which subsequently causes the camera clock to jump causing an apparent gap in footage (if the time jumps forward).

As shown at 310, if the condition determined to cause the performance deficiency is a network connectivity, FMP4, or other subsystem, a determination is made at 316 as to whether the camera is eligible for a firmware update. If the determination at 316 is yes, the camera's firmware is updated at 334. If the determination at 316 is no, a notification is generated to check with a subsystem owner at 336.

Figure 4:
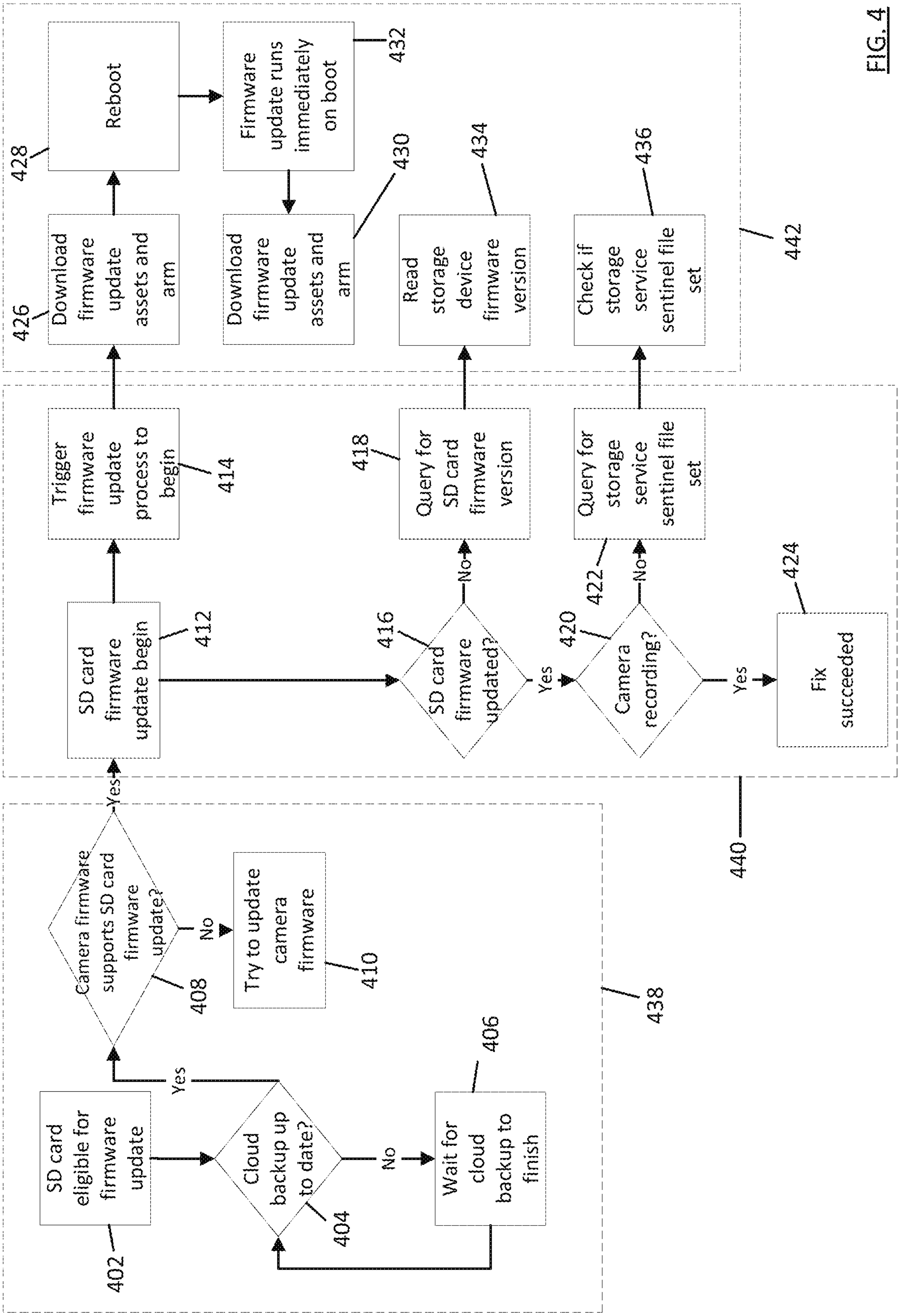
FIG. 4 illustrates a process to update the firmware for a storage device, according to an embodiment.

An example of upgrading storage device firmware as shown at 328 of FIG. 3 is illustrated at FIG. 4. FIG. 4 illustrates a process to update the firmware for a storage device (e.g., memory 144), according to an embodiment. FIG. 4 illustrates and is discussed with respect to any SD card, but can be applied to other types of storage devices. In some implementations, steps within box 438 can be performed by or at a first compute device (e.g., fleet management compute device 120), steps within box 442 can be performed by or at a second compute device (e.g., camera 140), and steps within box 440 can be performed by or at a third compute device (e.g., a tunnel compute device that is an intermediary between the first compute device and second compute device). In some implementations, steps within box 438 can be performed by or at a first compute device (e.g., fleet management compute device 120) and steps within boxes 440 and 442 can be performed by or at a second compute device (e.g., camera 140).

At 402, a determination is made that an SD card is eligible for a firmware update (e.g., based on FIG. 3). At 404, a determination is made as to whether a cloud backup is up to date (e.g., video 146 has been sent to and stored at storage compute device 100). If 404 is no, at 406, wait until the cloud backup is finished. If the outcome at 404 is yes, then at 408, a determination is made as to whether camera firmware supports a firmware update for the SD card. If the outcome at 408 is no, then at 410, an attempt is made to update the camera's firmware (e.g., so that the camera's updated firmware can support the firmware update for the SD card). If the outcome at 408 is yes, then at 412, the SD card's firmware update begins and is triggered at 414. Firmware update assets and arm are downloaded and the camera is rebooted at 428. The firmware update runs on boot at 423 and the firmware update is de-armed at 430. At 416, a determination is made as to whether the SD card firmware updated. If the outcome at 416 is yes, then at 418, the SD card is queried for firmware version and the firmware version is read from the storage device at 434. If the outcome at 416 is no, then at 420 a determination is made if the camera is recording. If the outcome is yes at 420, then the fix (e.g., the firmware update) is deemed a success at 424. If the outcome is no at 420, then a query is performed at 422 to determine whether the storage service sentinel file is properly set (e.g., by checking, at 436, whether the storage service sentinel file is set and/or what the value of the storage service sentinel file is.

In some implementations, FIG. 4 is related to a process to update the firmware of an SD card and deletes some or all data structures on the SD card so that the SD card fully resets state of the card and/or flashes the specified SD card firmware on the card (flashing may be useful if, for example, there is a fleet of cameras and some cameras have older SD card firmware versions that have vulnerabilities that can lead to data loss).

Figure 5:
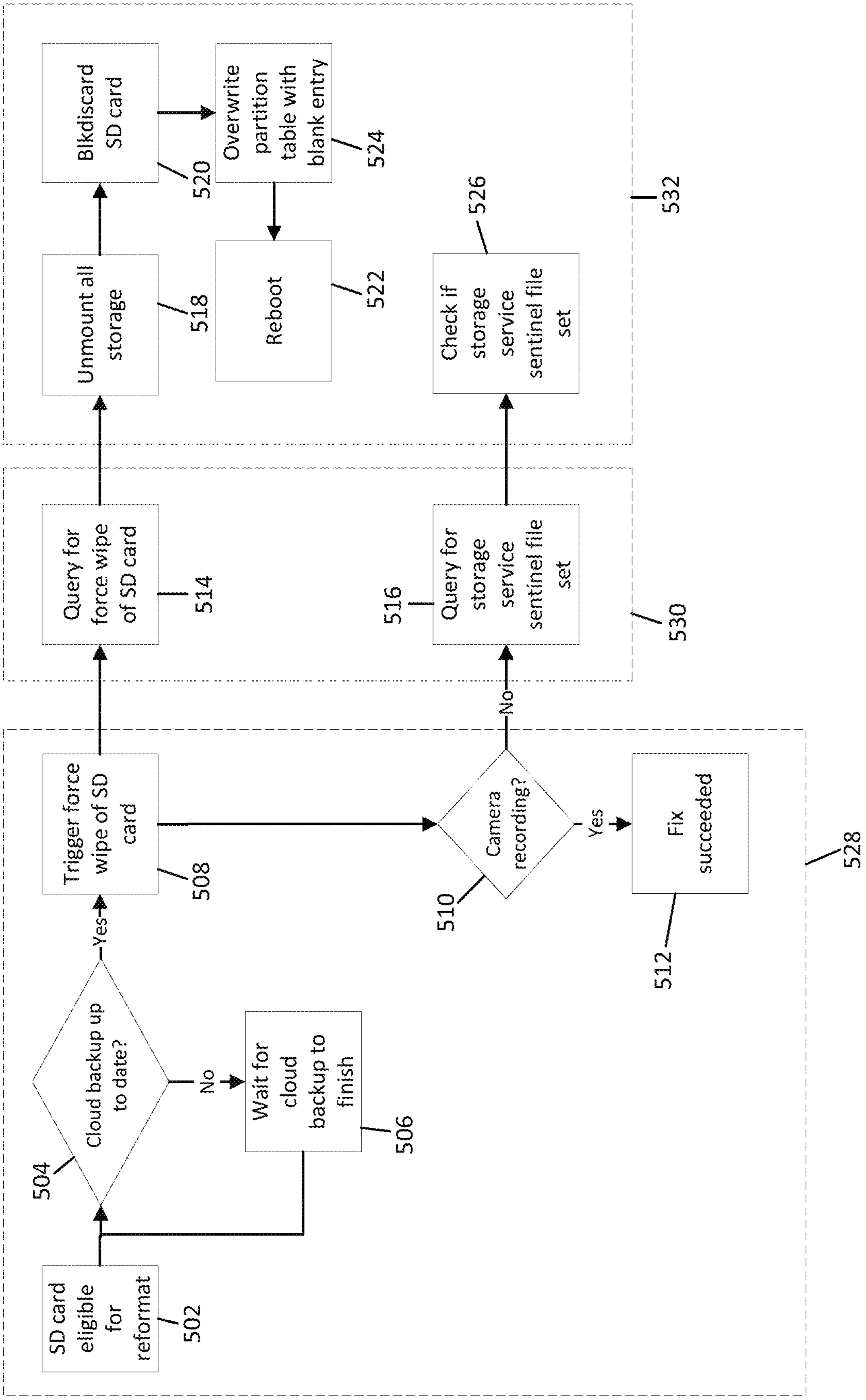
FIG. 5 illustrates a process to reformat a storage device, according to an embodiment.

An example of upgrading camera firmware as shown at 330 of FIG. 3 is illustrated at FIG. 5. FIG. 5 illustrates a process to reformat a storage device, according to an embodiment. FIG. 5 illustrates and is discussed with respect to any SD card, but can be applied to other types of storage devices. In some implementations, steps within box 528 can be performed by or at a first compute device (e.g., fleet management compute device 120), steps within box 532 can be performed by or at a second compute device (e.g., camera 140), and steps within box 530 can be performed by or at a third compute device (e.g., a tunnel compute device that is an intermediary between the first compute device and second compute device). In some implementations, steps within box 528 can be performed by or at a first compute device (e.g., fleet management compute device 120) and steps within boxes 530 and 532 can be performed by or at a second compute device (e.g., camera 140).

At 502, a determination is made that an SD card is eligible for reformatting (e.g., based on FIG. 3). At 504, a determination is made if a cloud backup is up to date (e.g., video 146 has been sent to and stored at storage compute device 100). If 504 is no, at 506, wait until the cloud backup is finished. If 504 is yes, at 508, a force wipe is triggered at the SD card. At 514, the force wipe of the SD card is queried. All storage is unmounted at 518, blkdiscard is performed on the SD card (e.g., process for instructing SD card to erase a range of logical block addresses; can trigger erasing of the logical to physical mapping within the SD card which can be useful if the mapping is corrupted or points to a bad block) at 520, a partition table(s) is overwritten with a blank entry at 524, and a reboot is performed at 522. Additionally, at 510, a determination is made if the camera is recording. If yes, at 512, the fix is deemed successful. If not, the storage service sentinel file set is queried at 516 and checked to confirm that the query result is the storage service sentinel file set at 526.

In some implementations, the process discussed with respect to FIG. 5 reformats the SD card so that a new partition table and filesystem is written at the next boot. Blkdiscard can refer to wiping all data in an efficient manner, which can help it get out of a "stuck" state by wiping these data structures clean.

Figure 6:
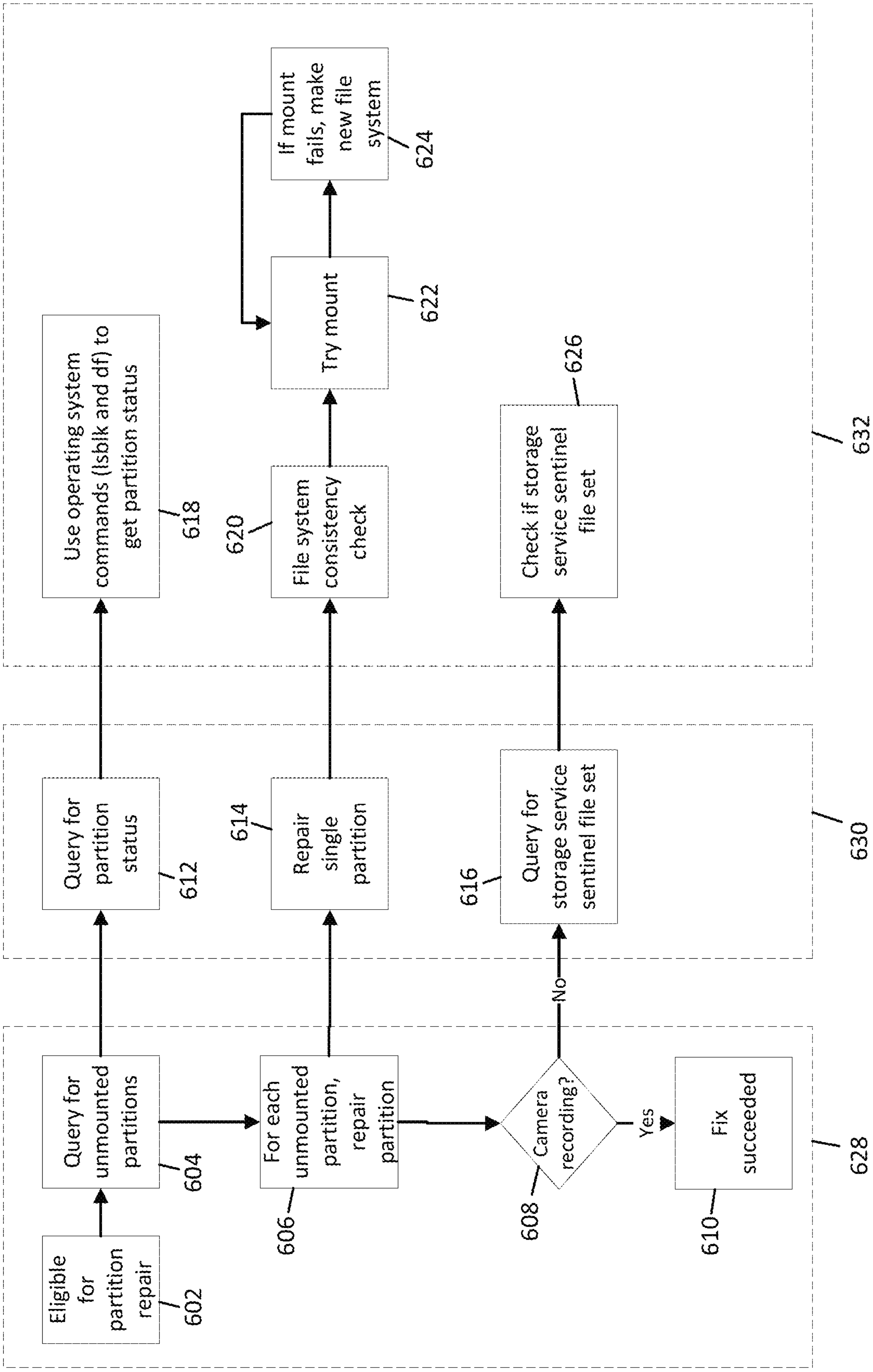
FIG. 6 illustrates a process to repair a storage device partition, according to an embodiment.

FIG. 6 illustrates a process to repair a storage device partition, according to an embodiment. Techniques described with respect to FIG. 6 can be applied to any type of storage device, such as an SD card. The process discussed with respect to FIG. 6 can be a non-destructive operation, and can fix any improperly formatted partitions that are unable to be mounted due to filesystem corruption. In some implementations, steps within box 628 can be performed by or at a first compute device (e.g., fleet management compute device 120), steps within box 632 can be performed by or at a second compute device (e.g., camera 140), and steps within box 630 can be performed by or at a third compute device (e.g., a tunnel compute device that is an intermediary between the first compute device and second compute device). In some implementations, steps within box 628 can be performed by or at a first compute device (e.g., fleet management compute device 120) and steps within boxes 630 and 632 can be performed by or at a second compute device (e.g., camera 140).

At 602, a determination is made that a storage device is available for a partition repair. At 604, a query is made for unmounted partitions. At 612, a query is made for partition status, and operating system commands (e.g., Isblk (e.g., command to display information about all block devices connected to the system) and/or df (e.g., command to display information about total space and available space on a file system)) are used to get partition status at 618. At 606, for each unmounted partition, that partition is repaired. A single partition is repaired at 614, a file system consistency check is performed at 620, a mount is attempted at 622, and, if the mount fails, a new file system is made/generated, and another mount attempt is performed at 622. Additionally, a determination is made at 608 as to whether the camera is recording. If the outcome is yes at 608, then at 610, the fix is deemed successful. If the outcome at 608 is no, then a query is performed at 616 to determine whether the storage service sentinel file is set (e.g., by performing a check at 626 based on a database or stored value).

Figure 7:
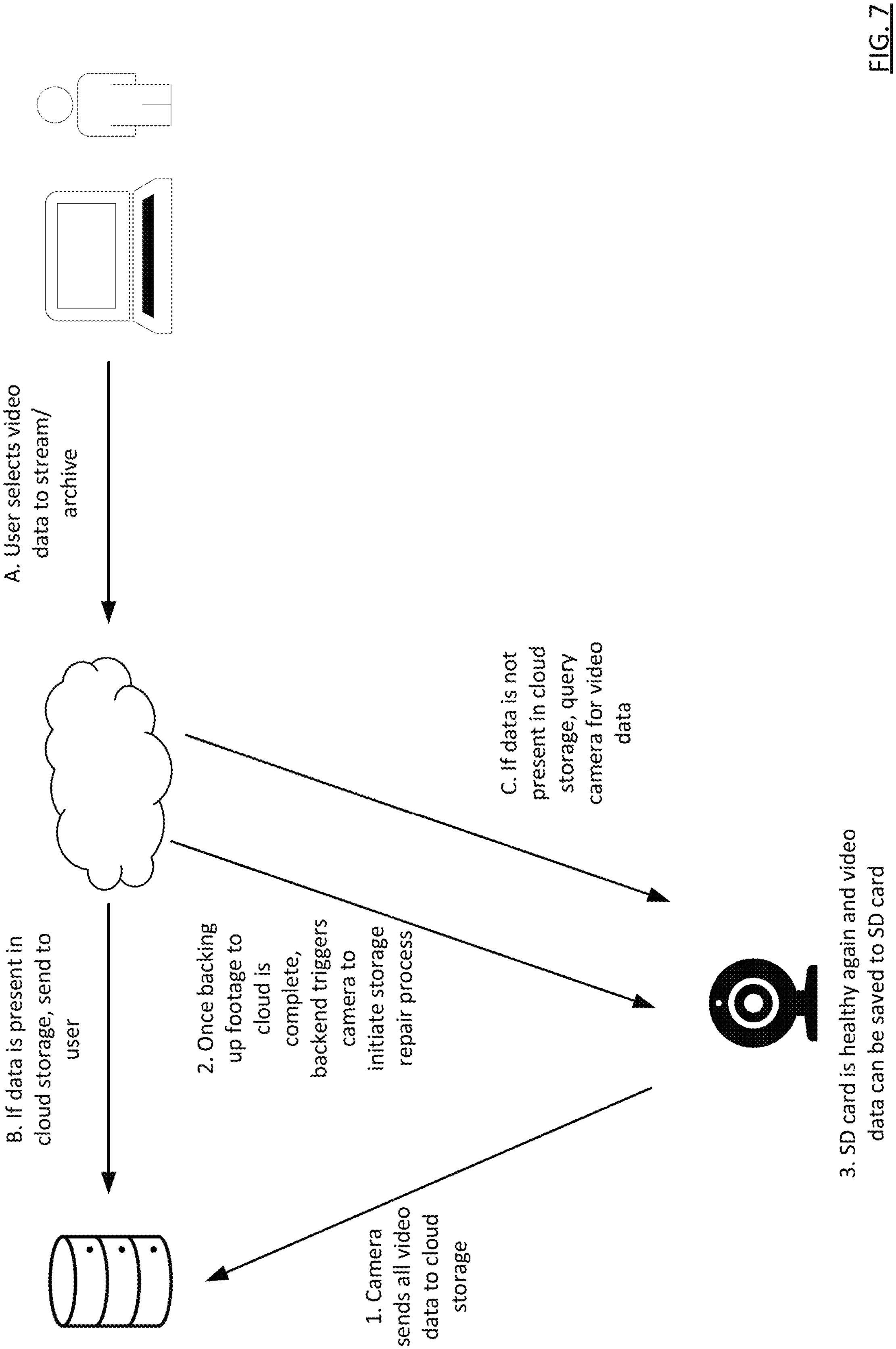
FIG. 7 illustrates an example of providing video to a user based on where the video is stored, according to an embodiment.

In some implementations, the backend (e.g., fleet management compute device 120) can switch the source for retrieving data between cloud storage (e.g., memory 104 of storage compute device 100) and camera storage (e.g., memory 144 of camera 140), which allows the user (e.g., of user compute device 160) to access requested data (e.g., video 146) even during/after the camera performs the storage repair process and erases the data stored locally on the camera. FIG. 7 illustrates an example of providing video to a user based on where the video is stored, according to an embodiment. Steps 1-3 can be related to writing data (e.g., video data) and steps A-C can be related to reading data (e.g., to a user). At step 1, a camera (e.g., camera 140) sends all video data (e.g., video 146) to a cloud storage (e.g., storage compute device 100). At step 2, once backing up video data to the cloud is complete, the backend (e.g., fleet management compute device 120) triggers the camera to initiate a storage repair process (e.g., firmware update, storage device reformat, partition reformat, forced time sync, and/or the like). At step 3, the storage repair process is performed and the SD card is deemed healthy again, so the cloud storage can send the video data to the camera for saving to the SD card. At step A, a user selects (e.g., using user compute device 160) the video data to stream/archive. If, at the time of step A, the requested video data is stored at the cloud storage, the cloud storage sends the video data to the user's compute device at step B. If, at the time of step A, the requested video data is stored at the camera and not at the cloud storage, the camera sends the requested video data to the user's compute device at step C.

Figure 8:
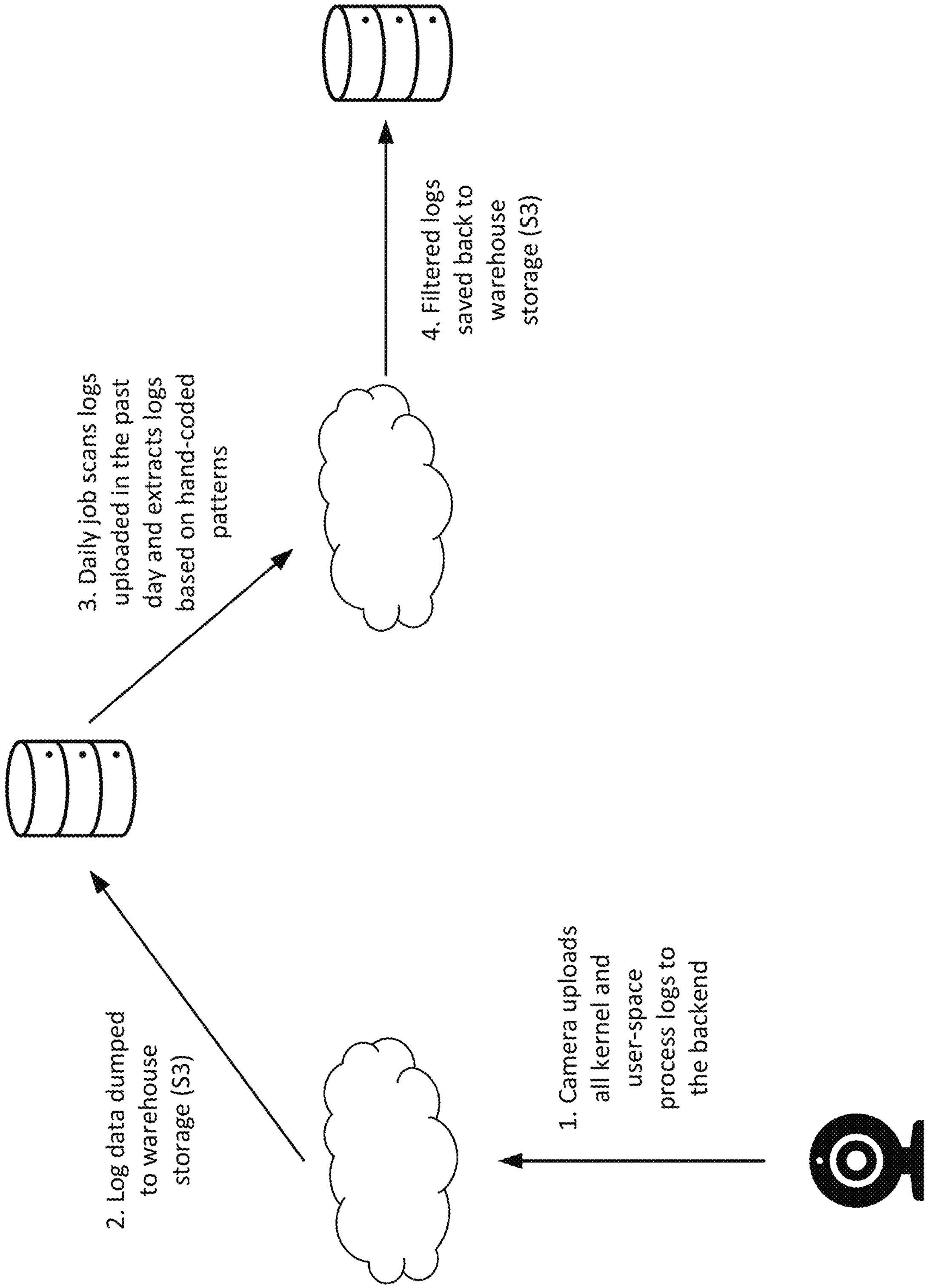
FIG. 8 illustrates a process to receive and store error logs, according to an embodiment.

Not all logs may be important for identifying the root cause of a camera's performance deficiency, and a size of the raw logs can result in an enormous amount of data to analyze. Accordingly, in some implementations, only logs that are relevant to storage systems (e.g., MMC, block IO, filesystem errors) or logs of storage-adjacent systems that can cause video data to be lost (e.g., NTP, encoder errors or other hardware issues) are kept (e.g., and non-relevant logs are deleted and/or not considered). FIG. 8 illustrates a process to receive and store error logs, according to an embodiment. At step 1, a camera (e.g., camera 140) uploads all kernel and user-space process logs (e.g., error logs 150) to the backend (e.g., fleet management compute device 120). At step 2, the log data is dumped to warehouse storage (e.g., Amazon S3®). At step 3, logs uploaded in a predetermined time period (e.g., the past day) are scanned and extracted/filtered based on hand-coded patterns. At step 4, the extracted/filtered logs are saved back to warehouse storage.

An error log being present at a part of the system doesn't always mean the root cause issue is directly related to that part of the system. Sometimes errors are transient and the log can be ignored, and other times an error log can be ignored because the error was triggered by an error in another part of the system (cascading error). Accordingly, in some implementations, logs filtered over a predetermined time period (e.g., the past several days) are used, as well as thresholds and error prioritization to determine the root cause error signature. An example of steps to filter logs to a root cause (e.g., single root cause) is shown in FIG. 9, and an example of an order in which the log messages are considered for labeling the cameras with the corresponding thresholds is shown at FIG. 10. For FIG. 9, some implementations can use a SQL query that maps a raw error message to one or more generic error messages. This procedure can de-duplicate error messages (e.g., kernel IO errors specify the address being operated on when the error occurred). Thus, for example, 100 IO error logs at different addresses could all be labelled/marked as "IO errors" despite being at different addresses.

Figure 11:
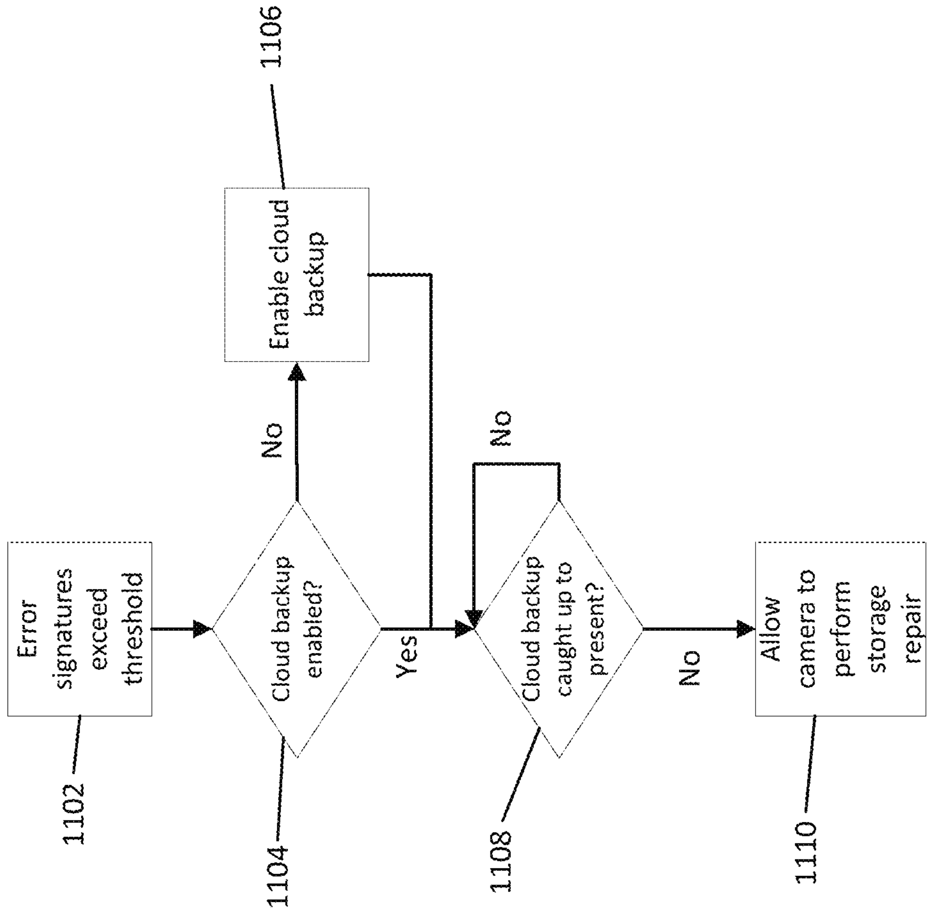
FIG. 11 illustrates a cloud backup process, according to an embodiment.

FIG. 11 illustrates a cloud backup process, according to an embodiment. At 1102, a determination is made (e.g., by fleet management compute device 120 and/or camera 140) that an error signature exceeds a predetermined threshold. At 1104, a determination is made (e.g., by fleet management compute device 120, camera 140, and/or storage compute device 100) as to whether cloud backup is enabled. If cloud backup is not enabled at 1104, then cloud backup is enabled at 1106. At 1108, a determination is made as to whether cloud backup is caught up to present (i.e., such that cloud backup properly reflects all expected data up to the time when the determination is made). If the outcome at 1108 is no, then 1108 is repeated until cloud backup is determined to be caught up to present. Also, if the outcome at 1108 is that cloud backup is not caught up to the present, then the camera is allowed to perform storage repair at 1110.

Figure 12:
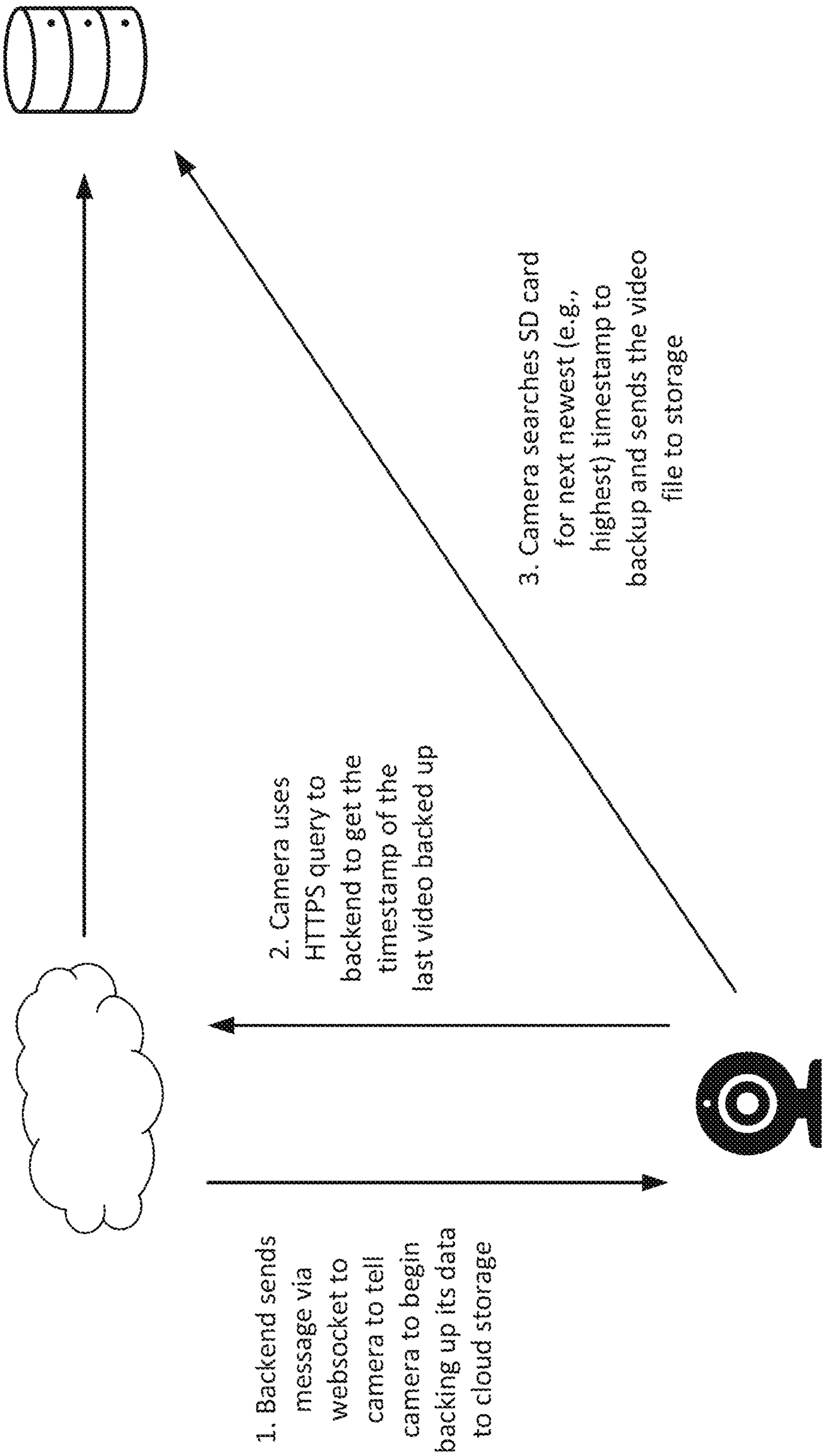
FIG. 12 illustrates a cloud backup process, according to an embodiment.

FIG. 12 illustrates a cloud backup process, according to an embodiment. At step 1, the backend (e.g., fleet management compute device 120) sends a message via websocket to the camera (e.g., camera 140) to begin backing up its data to cloud storage. At step 2, the camera uses a HTTPS query to query the backend and get the timestamp of the last video backed up. At step 3, the camera searches the SD card (e.g., memory 144) for next newest (e.g., highest, most recent, etc.) timestamp to backup, and sends the video file to storage (e.g., storage compute device 100).

Figure 13:
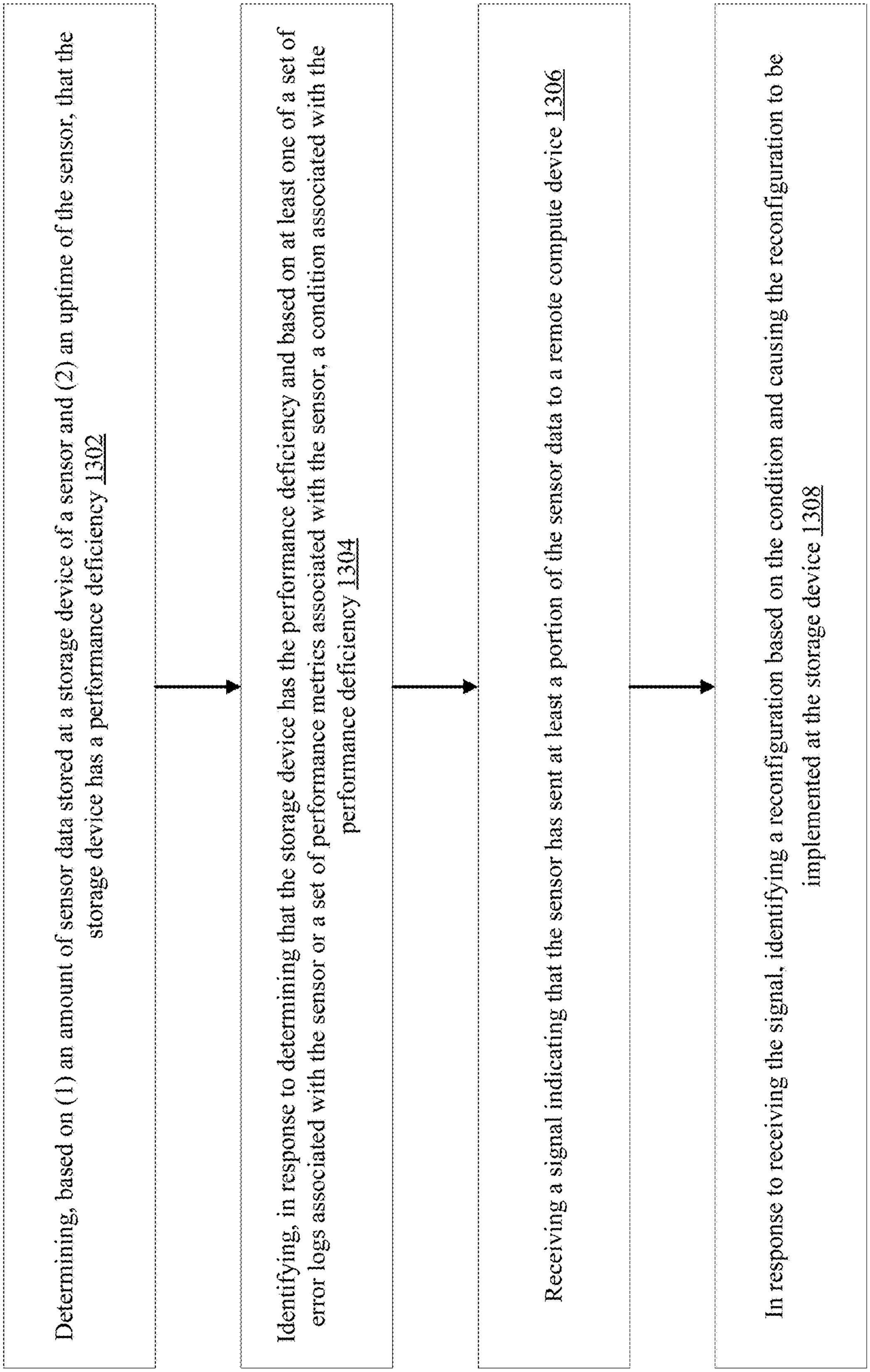
FIG. 13 shows a flowchart of a method to reconfigure a storage device in response to determining that the storage device has a performance deficiency, according to an embodiment.

FIG. 13 shows a flowchart of a method 1300 to reconfigure a storage device in response to determining that the storage device has a performance deficiency, according to an embodiment. In some implementations, method 1300 is performed by a processor (e.g., processor 122).

At 1302, a determination is made that a storage device (e.g., memory 144) of a sensor (e.g., camera 140) has a performance deficiency based on (1) an amount of sensor data (e.g., video 146) stored at the storage device and (2) an uptime (e.g., 148) of the sensor. At 1304, in response to determining that the storage device has the performance deficiency at 1302 and based on at least one of a set of error logs (e.g., error logs 150) associated with the sensor or a set of performance metrics (e.g., performance metrics 152) associated with the sensor, a condition associated with the performance deficiency is identified. At 1306, a signal (e.g., electronic signal) indicating that the sensor has sent at least a portion of the sensor data to a remote compute device (e.g., storage compute device 100) is received. At 1308, in response to receiving the signal, a reconfiguration is identified based on the condition and the reconfiguration is caused to be implemented at the storage device.

In some implementations of method 1300, the sensor includes a camera, the sensor data includes video, and the amount of the sensor data represents a duration of the video.

In some implementations of method 1300, the condition is identified based on detection of a plurality of errors from the set of error logs and associated with the storage device. Method 1300 can further include generating a list indicating a repair priority for each error from the plurality of errors, and the identifying the reconfiguration at 1308 can further be based on the list.

In some implementations of method 1300, the reconfiguration at 1308 includes at least one of a firmware update, a reformatting of the storage device, a reformatting of a partition of the storage device, or a forced time sync.

In some implementations of method 1300, the amount of sensor data is a first amount of sensor data and the uptime is a first uptime, and method 1300 further comprises determining, (1) after causing the reconfiguration to be implemented at the storage device at 1308 and (2) based on a second amount of sensor data stored at the storage device and a second uptime of the sensor, that no further reconfiguration of the storage device is needed.

In some implementations of method 1300, the identifying the condition at 1304 includes detecting an anomaly based on (1) a correlation of the uptime and the set of performance metrics associated with the sensor, and (2) a predefined threshold associated with at least one performance metric from the set of performance metrics.

In some implementations of method 1300, the identifying the condition at 1304 includes inputting the at least one of the set of error logs or the set of performance metrics to a machine learning model configured to generate an output indicating the condition.

In some implementations of method 1300, the identifying the condition associated with the performance deficiency at 1308 is based on the set of error logs, and the set of error logs is a filtered set of error logs from which non-relevant logs have been excluded.

Figure 14:
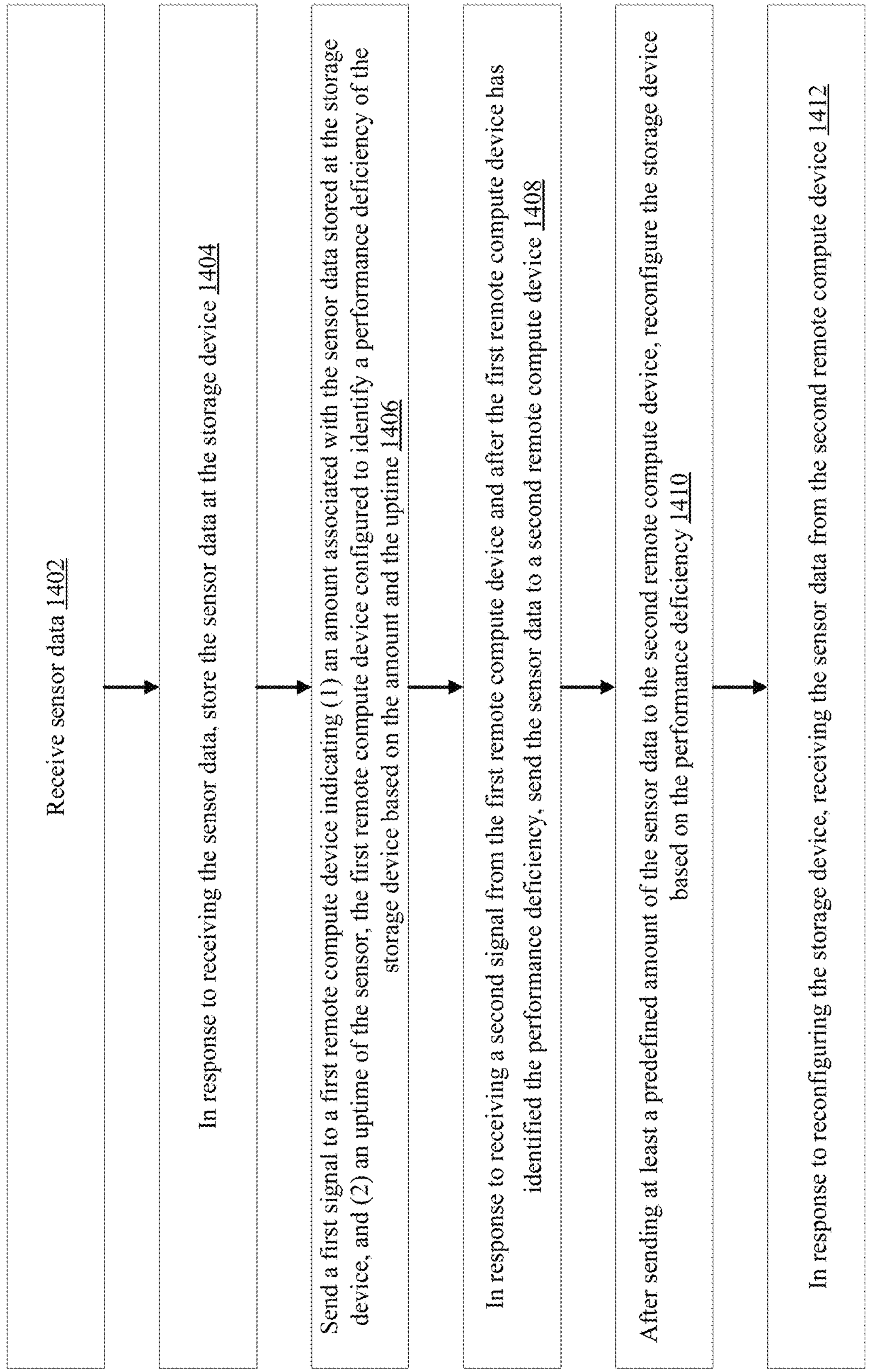
FIG. 14 shows a flowchart of a method to reconfigure a storage device without losing data storage device, according to an embodiment.

FIG. 14 shows a flowchart of a method 1400 to reconfigure a storage device without losing data storage device, according to an embodiment. In some implementations, method 1400 is performed by a processor (e.g., processor 142).

At 1402, sensor data (e.g., video 146) is received. At 1402, in response to receiving the sensor data at 1402, the sensor data is stored at a storage device (e.g., memory 144) of a sensor (e.g., camera 140). At 1406, a first signal is sent to a first remote compute device (e.g., fleet management compute device 120) indicating (1) an amount associated with the sensor data stored at the storage device, and (2) an uptime (e.g. uptime 148) of the sensor. The first remote compute device is configured to identify a performance deficiency of the storage device based on the amount and the uptime. At 1408, in response to receiving a second signal from the first remote compute device and after the first remote compute device has identified the performance deficiency, the sensor data is sent to a second remote compute device (e.g., storage compute device 100). At 1410, after sending at least a predefined amount of the sensor data to the second remote compute device, the storage device is reconfigured based on the performance deficiency. At 1412, in response to reconfiguring the storage device at 1410, the sensor data is received from the second remote compute device.

In some implementations of method 1400, the sensor includes a camera and the sensor data includes video.

Some implementations of method 1400 further include receiving, from a third remote compute device (e.g., user compute device 160) and before sending the sensor data to the second remote compute device, a request to access the sensor data. Method 1400 can further include causing the sensor data to be sent to the third remote compute device.

Some implementations of method 1400 further include receiving, from a third remote compute device (e.g., user compute device 160), after sending the sensor data to the second remote compute device, and before receiving the sensor data from the second remote compute device, a request to access the sensor data. Method 1400 can further include sending a signal to the second remote compute device to cause the second remote compute device to send the sensor data to the third remote device. Method 1400 can further include refraining from causing the sensor data to be sent to the third remote compute device.

In some implementations of method 1400, reconfiguring the storage device at 1410 includes receiving a representation of a firmware update for the storage device from the first remote compute device. The firmware update can include at least a command to reset the storage device.

In some implementations of method 1400, reconfiguring the storage device at 1410 includes reformatting the storage device so that at least one of a partition table at the storage device or a filesystem at the storage device is written at the storage device in response to a reboot. Method 1400 can further include rebooting the storage device.

In some implementations of method 1400, reconfiguring the storage device at 1410 includes reformatting at least one improperly formatted partition at the storage device.

In some implementations of method 1400, reconfiguring the storage device at 1410 includes forcing a time sync at the storage device.

Figure 15:
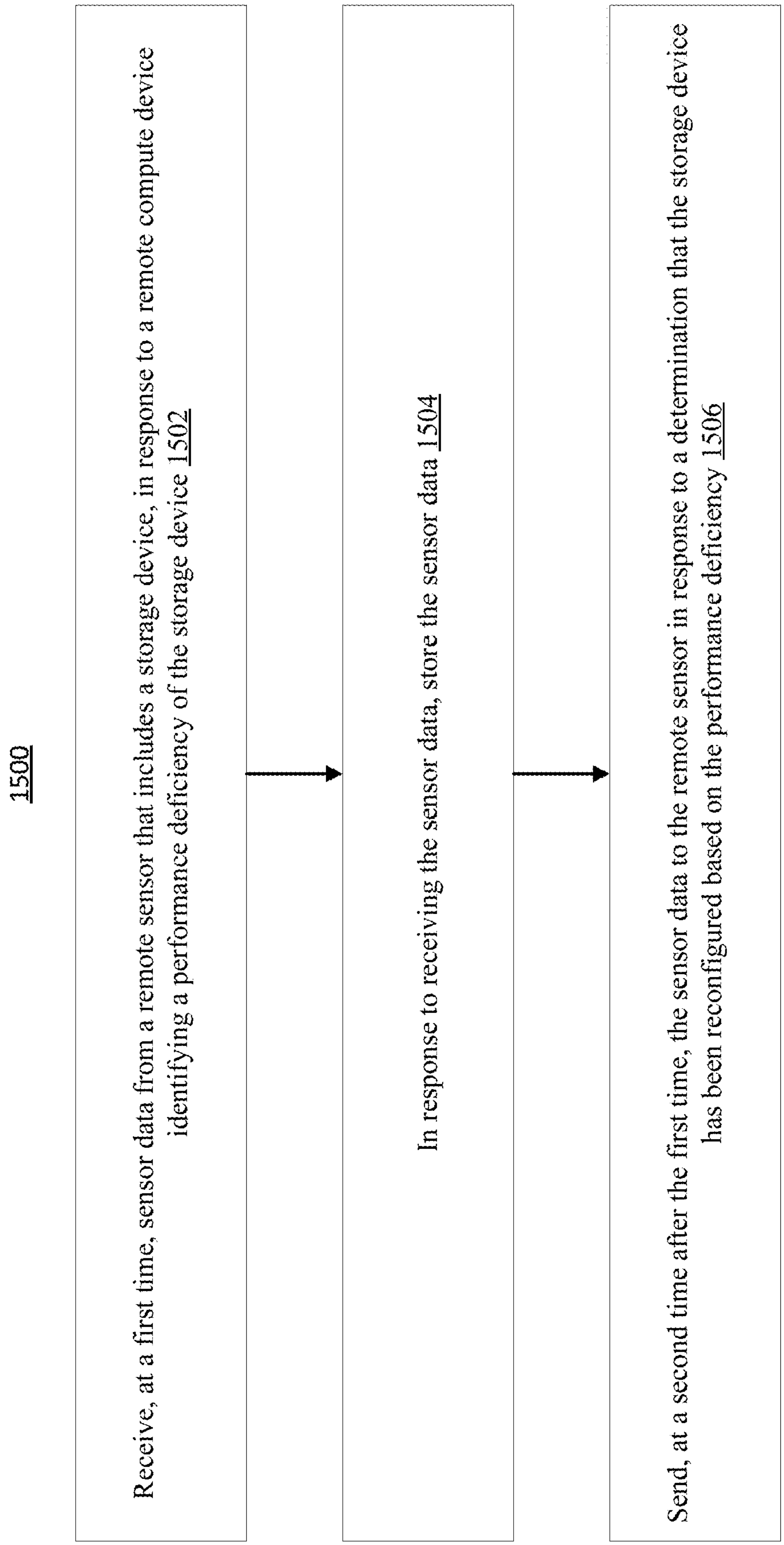
FIG. 15 shows a flowchart of a method to store and hold sensor data until a storage device has been reconfigured, according to an embodiment.

FIG. 15 shows a flowchart of a method 1500 to store and hold sensor data until a storage device has been reconfigured, according to an embodiment. In some implementations, method 1500 is performed by a processor (e.g., processor 102).

At 1502, sensor data (e.g., video 146) from a remote sensor (e.g., camera 140) that includes a storage device (e.g., memory 144) is received at a first time and in response to a remote compute device (e.g., fleet management compute device 120) identifying a performance deficiency of the storage device. At 1504, in response to receiving the sensor data, the sensor data is stored (e.g., at memory 104). At 1506, the sensor data is sent to the remote sensor at a second time after the first time and in response to a determination (e.g., processor 102 and/or a different processor of a different compute device) that the storage device has been reconfigured based on the performance deficiency.

In some implementations of method 1500, the remote compute device is a first remote compute device and method 1500 further includes receiving, from a second remote compute device (e.g., user compute device 160), after the first time and before the second time, a request for the sensor data. Method 1500 can further include, in response to receiving the request for the sensor data, causing a representation of the sensor data to be sent to the second remote compute device.

In some implementations of method 1500, the storage device is a secure digital (SD) card and the remote sensor includes a camera.

In some implementations of method 1500, the remote compute device is configured to identify the performance deficiency based on at least one of an amount of sensor data stored at the storage device or an uptime (e.g., uptime 148) of the remote sensor.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

What is claimed is:

1. A method, comprising:

determining, at a processor and based on (1) an amount of sensor data stored at a storage device of a sensor and (2) an uptime of the sensor, that the storage device has a performance deficiency;

identifying a condition associated with the performance deficiency via the processor, in response to determining that the storage device has the performance deficiency, and based on at least one of a set of error logs associated with the sensor or a set of performance metrics associated with the sensor, the condition (1) including a filesystem data structure error and (2) not including a MultiMediaCard (MMC) error;

receiving, at the processor, a signal indicating that the sensor has sent at least a portion of the sensor data to a remote compute device; and in response to receiving the signal:

identifying a reconfiguration based on the condition, the reconfiguration including a reformatted partition of the storage device, and causing the reconfiguration to be implemented at the storage device.

2. The method of claim 1, wherein the sensor includes a camera, the sensor data includes video, and the amount of the sensor data represents a duration of the video.

3. The method of claim 1, wherein the condition is identified based on detection of a plurality of errors from the set of error logs and associated with the storage device, the method further comprising:

generating a list indicating a repair priority for each error from the plurality of errors, the identifying the reconfiguration further based on the list.

4. The method of claim 1, wherein the reconfiguration further includes at least one of a firmware update, a reformatting of the storage device, or a forced time sync.

5. The method of claim 1, wherein the amount of sensor data is a first amount of sensor data and the uptime is a first uptime, the method further comprising:

determining, (1) after causing the reconfiguration to be implemented at the storage device and (2) based on a second amount of sensor data stored at the storage device and a second uptime of the sensor, that no further reconfiguration of the storage device is needed.

6. The method of claim 1, wherein the identifying the condition includes detecting an anomaly based on (1) a correlation of the uptime and the set of performance metrics associated with the sensor, and (2) a predefined threshold associated with at least one performance metric from the set of performance metrics.

7. The method of claim 1, wherein the identifying the condition includes inputting the at least one of the set of error logs or the set of performance metrics to a machine learning model configured to generate an output indicating the condition.

8. The method of claim 1, wherein the identifying the condition associated with the performance deficiency is based on the set of error logs, and the set of error logs is a filtered set of error logs from which non-relevant logs have been excluded.

9. A sensor, comprising:

a storage device; and a processor operatively coupled to the storage device, the processor configured to:

receive sensor data;

in response to receiving the sensor data, store the sensor data at the storage device;

send a first signal to a first remote compute device indicating (1) an amount associated with the sensor data stored at the storage device, and (2) an uptime of the sensor, the first remote compute device configured to identify a performance deficiency of the storage device based on the amount and the uptime, the performance deficiency including one of (i) a MultiMediaCard (MMC) command to the storage device that failed or (ii) the storage device not storing previously recorded sensor data;

in response to receiving a second signal from the first remote compute device and after the first remote compute device has identified the performance deficiency, send the sensor data to a second remote compute device;

after sending at least a predefined amount of the sensor data to the second remote compute device, reconfigure the storage device based on the performance deficiency by one of (a) reformatting at least one of a partition at the storage device or a filesystem at the storage device in response to a reboot, and rebooting the storage device, (b) rewriting a partition table at the storage device, and rebooting the storage device, or (c) deleting at least one data file from the storage device; and in response to reconfiguring the storage device, receive the sensor data from the second remote compute device.

10. The sensor of claim 9, wherein the sensor includes a camera and the sensor data includes video.

11. The sensor of claim 9, wherein the processor is further configured to:

receive, from a third remote compute device and before sending the sensor data to the second remote compute device, a request to access the sensor data; and cause the sensor data to be sent to the third remote compute device.

12. The sensor of claim 9, wherein the processor is further configured to:

receive, from a third remote compute device, after sending the sensor data to the second remote compute device, and before receiving the sensor data from the second remote compute device, a request to access the sensor data;

send a signal to the second remote compute device to cause the second remote compute device to send the sensor data to the third remote compute device; and refrain from causing the sensor data to be sent to the third remote compute device.

13. The sensor of claim 9, wherein the performance deficiency further includes a process crashing and the processor is further configured to reconfigure the storage device by:

receiving a representation of a firmware update for the storage device from the first remote compute device, the firmware update including at least a command to reset the storage device.

14. The sensor of claim 9, wherein the processor is further configured to reconfigure the storage device by forcing a time sync at the storage device.

15. A non-transitory, processor-readable medium storing instructions that, when executed by a processor, cause the processor to:

receive, at a first time, sensor data from a remote sensor that includes a storage device, in response to a remote compute device identifying a performance deficiency of the storage device, the performance deficiency including one of (i) a MultiMediaCard (MMC) command to the storage device that failed or (ii) the storage device not storing previously recorded sensor data;

in response to receiving the sensor data, store the sensor data;

send, at a second time after the first time, the sensor data to the remote sensor in response to a determination that the storage device has been reconfigured based on the performance deficiency by one of (a) reformatting and rebooting the storage device, or (b) deleting at least one data structure from the storage device; and in response to sending the sensor data to the remote sensor, delete the sensor data.

16. The non-transitory, processor-readable medium of claim 15, wherein the remote compute device is a first remote compute device and the instructions further include instructions to cause the processor to:

receive, from a second remote compute device, after the first time and before the second time, a request for the sensor data; and in response to receiving the request for the sensor data, cause a representation of the sensor data to be sent to the second remote compute device.

17. The non-transitory, processor-readable medium of claim 15, wherein the storage device is a secure digital (SD) card and the remote sensor includes a camera.

18. The non-transitory, processor-readable medium of claim 15, wherein the remote compute device is configured to identify the performance deficiency based on at least one of an amount of sensor data stored at the storage device or an uptime of the remote sensor.

* * * * *